UNITED STATES PATENT OFFICE.

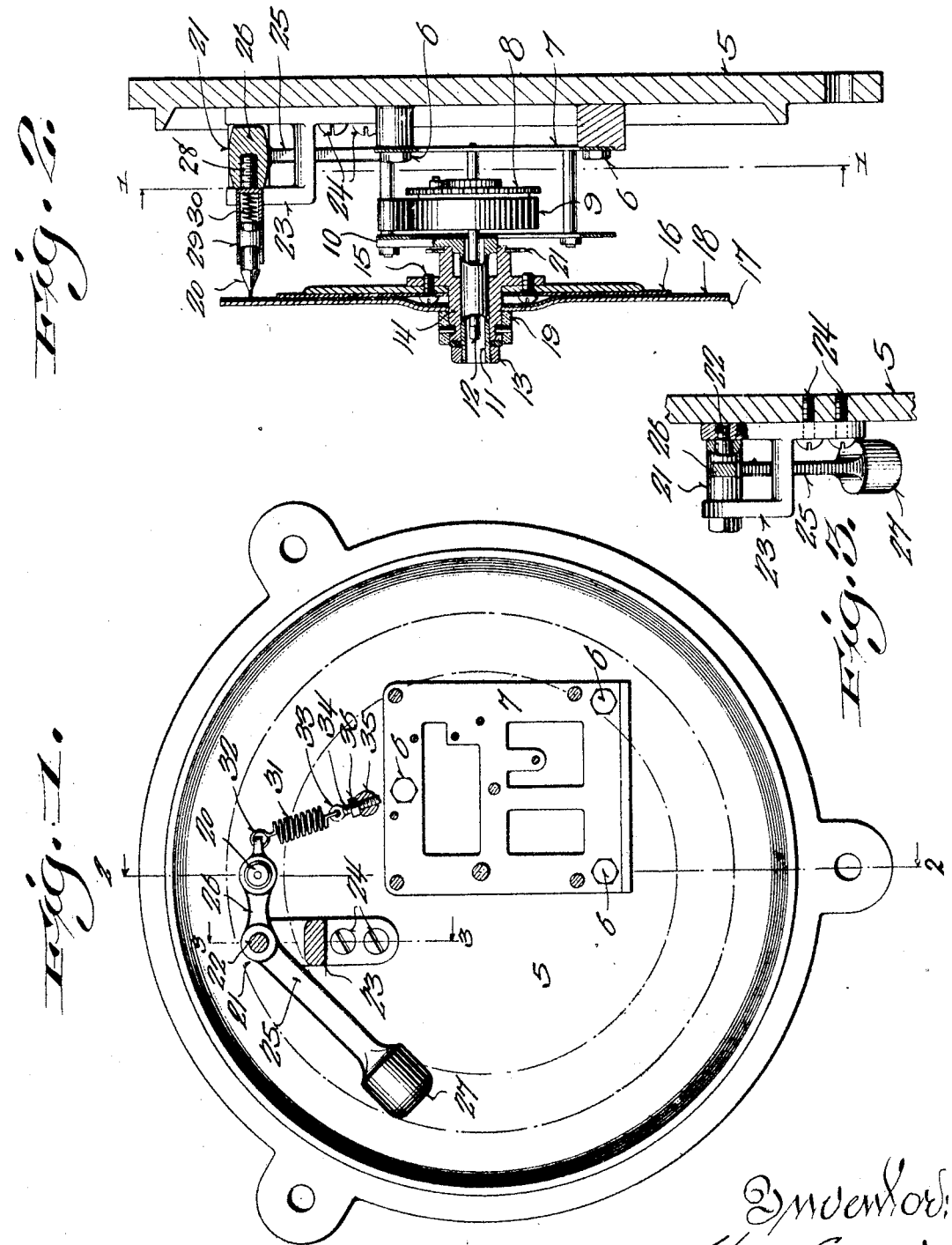

HANS SATTLER, OF SHEBOYGAN, WISCONSIN.

VIBRATION-RECORDER.

1,240,883.
Specification of Letters Patent. Patented Sept. 25, 1917.

Application filed April 13, 1917. Serial No. 161,777.

*To all whom it may concern:*

Be it known that I, HANS SATTLER, a citizen of the United States, and resident of Sheboygan, in the county of Sheboygan and State of Wisconsin, have invented certain new and useful Improvements in Vibration-Recorders; and I do hereby declare that the following is a full, clear, and exact description thereof.

My invention relates to certain new and useful improvements in vibration recorders and refers particularly to such a device for automatically recording the running or movement of automobiles, and other vehicles or moving bodies, by actuation of certain mechanism from vibrations of the vehicle or body during the period it is in use.

The primary object of my invention is the provision of such a device which will give the owner of a vehicle a complete record of the operation or travel of the vehicle for a certain period of time, as for instance twenty-four hours, and in this way allowing the owner to ascertain whether or not the driver has been unlawfully using such vehicle.

With the above and other objects in view which will appear as the description proceeds, the invention resides in the novel construction, combination and arrangement of parts hereinafter described and then sought to be clearly defined by the claims, it being understood that changes in the precise embodiment of the invention herein disclosed can be made without departing from the spirit of the invention.

In the accompanying drawing I have illustrated one complete example of the physical embodiment of my invention constructed according to the best mode I have so far devised for the practical application of the principles of my invention.

Figure 1 is a sectional view taken on line 1—1 of Fig. 2.

Fig. 2 is a view partly in section and partly in plan, taken on line 2—2 of Fig. 1, and Fig. 3 is a view, with parts in section and parts in elevation, taken on line 3—3 of Fig. 1.

In the drawing, the numeral 5 designates the supporting base of the recorder to which is secured by any suitable fastenings 6, the frame 7 for the train of gears 8, and as they are of the usual clock movement construction, except as to the manner of winding the spring 9 and the connection of the gears with the dial plate, a further description is thought unnecessary.

Secured to the top member of the frame 7 is the arm 10 which has formed on one end a sleeve 11 surrounding the winding stem or arbor 12 of the spring 9, the spring being wound by inserting a suitable key (not shown) in said sleeve to engage the arbor as will be readily seen by reference to Fig. 2.

The outer end of the sleeve 11 is threaded to receive a nut 13 which revolubly retains on said sleeve the bushing 14 secured to which by suitable fastenings 15 is the plate 16, and between this plate and the dial plate 17, is secured the record-receiving dial plate 17, is secured the record-receiving dial 18, said dial plate 17 with dial 18 is held in place by the nut 13 bearing against the collar 19. In order to allow a space on the record-receiving dial for the stylus or marker 20 to track and record the vibrations, the plate 16 is made smaller in diameter than the plate 17 and dial 18, the construction and operation of the stylus 20 being hereinafter described.

The bushing 14, and with it the plates 16 and 17, and record-receiving dial 18, is so geared through the medium of the gear 21 carried by the bushing 14, as to revolve one complete revolution within a certain period of time, as for example twenty-four hours.

For working the stylus 20 to record the vibrations I employ a novel form of balanced pendulum 21 which is pivoted at 22 in the forked bearing 23 secured to the base 5 by any suitable fastenings 24. This pendulum is formed with the two arms 25 and 26, the arm 25 being formed with an enlarged portion 27 acting as a balancing weight, and the arm 26 having secured therein the threaded end 28 of the stylus receiving pocket 29, having the light spring 30 for forcing the stylus against the record-receiving dial 18.

In order to control or to return the pendulum to normal position after each shock or vibration, a spiral spring 31 is employed, one end of which is secured to the arm 26 at 32 and the other end of which is secured to the eye 33 of the adjusting screw 34, secured in the post 35 secured to the supporting base 5, a locking nut 36 being employed to lock the adjusting screw 34 in the desired adjustment.

It will be understood that the dial 18 is revolving at a certain speed and may be divided into hours or any other desired divisions, and that when the body to which my device is attached is standing still the stylus 20 will record an unbroken line upon the revolving dial 18, but when the body is in motion the stylus will record a jagged or broken line as the pendulum is vibrated by the shocks or vibrations caused by the movement of the body.

While I have mentioned my device as for use in keeping record of the movements of vehicles, it may be used in testing the efficiency of shock absorbers or the like, by first running a vehicle not equipped with shock absorbers over a road and then running the same vehicle over the same road after it has been equipped with such absorbers, and then comparing the two records obtained by my device, as will be apparent to those skilled in the art to which an invention of this character appertains.

What is claimed is:

1. In a vibration recorder, the combination with a continuously revolving record receiving dial and its operating mechanism and supporting base therefor, of a forked bearing secured to the base, a pendulum pivotally mounted in said bearing, said pendulum being bent to form an obtuse angle and having one of its arms weighted, a stylus carried by the other arm of the pendulum and bearing on the dial to record the vibrations of the body to which the recorder is attached, and spring means connecting the arm carrying the stylus and the supporting base for the purpose described.

2. In a vibration recorder, the combination with a continuously revolving record receiving dial and its operating mechanism and supporting base therefor, of a pendulum open to form an obtuse angle and pivotally supported from the supporting base at the apex of the angle, one arm of the angle being longer than the other said longer arm being weighted, a stylus carried by the shorter of the arms and bearing upon the record receiving dial to record the vibrations of the body to which the recorder is attached, and spring means connected with the outer end of the shorter arm and supporting base to govern the movement of the pendulum, substantially as described.

3. In a device of the character described, the combination with a continuously revolving record-receiving dial and its operating mechanism and supporting base therefor, of a bearing secured to said supporting base formed by a base plate having a laterally and then upwardly extending arm carried thereby, a pendulum open to form an obtuse angle and having its apex pivotally secured in the forked end of said bearing, one arm of the pendulum being longer than the other, said longer arm being weighted and extending downwardly at an incline and said shorter arm extending outwardly from said bearing on a substantially horizontal plane, a socket formed in the outer free end of said shorter arm, a stylus carried by said socket and being resiliently urged against the record-receiving dial to record the vibrations of the body to which the recorder is attached, and an adjustable spring connected with the outer end of the shorter arm and with said supporting base for returning the pendulum to normal position after each vibration thereof substantially as described.

In testimony that I claim the foregoing I have hereunto set my hand at Milwaukee, in the county of Milwaukee and State of Wisconsin.

HANS SATTLER.